United States Patent
Kawano et al.

(10) Patent No.: US 9,941,787 B2
(45) Date of Patent: Apr. 10, 2018

(54) REFERENCE VOLTAGE GENERATION CIRCUIT AND DCDC CONVERTER HAVING THE SAME

(71) Applicant: SII Semiconductor Corporation, Chiba-shi, Chiba (JP)

(72) Inventors: Akihiro Kawano, Chiba (JP); Katsuya Goto, Chiba (JP)

(73) Assignee: SII SEMICONDUCTOR CORPORATION, Chiba (JP)

( * ) Notice: Subject to any disclaimer, the term of this patent is extended or adjusted under 35 U.S.C. 154(b) by 0 days.

(21) Appl. No.: 15/494,834

(22) Filed: Apr. 24, 2017

(65) Prior Publication Data

US 2017/0310214 A1 Oct. 26, 2017

(30) Foreign Application Priority Data

Apr. 25, 2016 (JP) ................................. 2016-087135

(51) Int. Cl.
 *G05F 3/16* (2006.01)
 *H02M 3/156* (2006.01)
 *H02M 1/36* (2007.01)

(52) U.S. Cl.
 CPC ............. *H02M 3/156* (2013.01); *H02M 1/36* (2013.01)

(58) Field of Classification Search
 CPC ........... G05F 3/30; G05F 1/46; H03K 17/223; H03K 17/164; H02M 1/08
 USPC ................ 323/265, 266, 271, 273, 311–317; 327/108, 109, 513, 534–541
 See application file for complete search history.

(56) References Cited

U.S. PATENT DOCUMENTS

| | | | | |
|---|---|---|---|---|
| 5,773,967 A * | 6/1998 | Tenten | .................... | G01R 35/00 323/313 |
| 9,509,205 B2 * | 11/2016 | Gambetta | ............. | H02M 3/156 |
| 2005/0237045 A1 * | 10/2005 | Lee | ........................... | G05F 3/30 323/313 |
| 2009/0256623 A1 * | 10/2009 | Tajima | ...................... | G05F 3/30 327/512 |
| 2009/0290386 A1 * | 11/2009 | Ikeda | ................ | H02M 3/33523 363/19 |

FOREIGN PATENT DOCUMENTS

JP 2016-160700 A 7/2010

* cited by examiner

*Primary Examiner* — Rajnikant Patel

(74) *Attorney, Agent, or Firm* — Brinks Gilson & Lione

(57) ABSTRACT

A reference voltage generation circuit includes a bandgap reference circuit, a first resistive element and a second resistive element connected in series between the output node and a ground terminal, a third resistive element, a fourth resistive element, and a first switch connected in series between the output node and the ground terminal, and a second switch having one end connected to a connecting point of the first resistive element and the second resistive element, at which a reference voltage is generated, and the other end connected to a connecting point of the third resistive element and the fourth resistive element. A ratio between resistance values of the first resistive element and the second resistive element is equal to a ratio between resistance values of the third resistive element and the fourth resistive element. The first and second switches are turned on at power-on and turned off after the reference voltage is started.

8 Claims, 4 Drawing Sheets

REFERENCE VOLTAGE GENERATION CIRCUIT AND DCDC CONVERTER HAVING THE SAME

RELATED APPLICATIONS

This application claims priority under 35 U.S.C. § 119 to Japanese Patent Application No. 2016-087135 filed on Apr. 25, 2016, the entire content of which is hereby incorporated by reference.

BACKGROUND OF THE INVENTION

Field of the Invention

The present invention relates to a reference voltage generation circuit and a DCDC converter equipped therewith.

Background Art

The recent electronic devices, particularly, a smart phone, a portable device, a wearable device, etc. have been required to have low power consumption in order to prolong an operating time of a battery-driven product.

In the electronic devices as described above, a DCDC converter such as a switching regulator, an LDO regulator or the like has been used as a power supply device which supplies a power supply to a microcomputer, an AP (Application Processor), a memory, a sensor, etc.

A reference voltage input to an error amplifier or the like used in the DCDC converter is required to be a stable voltage hard to be affected by variations in power supply voltage and temperature. A reference voltage having a necessary voltage value is generated using a bandgap reference circuit capable of generating such a stable voltage.

One example of a circuit configuration capable of obtaining a reference voltage having a desired voltage value from a bandgap voltage being an output of such a bandgap reference circuit is illustrated in FIG. 4.

FIG. 4 is a circuit diagram of a related art reference voltage generation circuit 400. The reference voltage generation circuit 400 is comprised of a bandgap reference circuit 40 and an output circuit 41.

Since the bandgap reference circuit 40 is generally known (refer to, for example, Patent Document 1), the description thereof will be omitted here.

The output circuit 41 is equipped with resistive elements 401 and 402 connected in series between an output node from which a bandgap voltage VBG generated by the bandgap reference circuit 40 is output, and a ground terminal. By appropriately changing resistance values of the resistive elements 401 and 402, a resistance-divided desired reference voltage VREF is obtained from a connecting point of the resistive elements 401 and 402.

[Patent Document 1] Japanese Patent Application Laid-Open No. 2010-160700

SUMMARY OF THE INVENTION

A DCDC converter is required to highly maintain efficiency even though a current supplied from an output terminal to a load varies widely from a low current to a large current. Particularly when the DCDC converter is used in a device required to have low power consumption, it becomes important to maintain high efficiency in a light load current region.

The present invention has been made in view of the foregoing demand and aims to provide a reference voltage generation circuit capable of starting with low power consumption and in a short time, and a DCDC converter equipped therewith.

In order to solve the above problems, there is provided a reference voltage generation circuit of the present invention, which is equipped with a bandgap reference circuit which generates a bandgap voltage at an output node, a first resistive element and a second resistive element connected in series between the output node and a ground terminal, a third resistive element, a fourth resistive element, and a first switch connected in series between the output node and the ground terminal, a second switch having one end connected to a connecting point of the first resistive element and the second resistive element, and the other end connected to a connecting point of the third resistive element and the fourth resistive element, and a control circuit which generates a control signal controlling on/off of the first and second switches. A ratio between resistance values of the first resistive element and the second resistive element is equal to a ratio between resistance values of the third resistive element and the fourth resistive element. The first and second switches are turned on when the control signal is a first state and turned off when the control signal is a second state. A first reference voltage is generated at the connecting point of the first resistive element and the second resistive element.

A DCDC converter of the present invention is equipped with the reference voltage generation circuit and an error amplifier having an inversion input terminal input with a feedback voltage obtained by dividing an output voltage, and a non-inversion input terminal input with the first reference voltage.

Another DCDC converter of the present invention is equipped with the reference voltage generation circuit. The control circuit brings the control signal into a first state at power-on and brings the control signal into a second state, based on the completion of a soft start executed from the time of the power-on.

A further DCDC converter of the present invention is equipped with the reference voltage generation circuit. The control circuit brings the control signal into a first state in a PWM mode, and brings the control signal into a second state in a PFM mode.

According to a reference voltage generation circuit of the present invention, a control signal is brought into a first state upon power-on to turn on first and second switches, whereby a current path including third and fourth resistive elements and a first switch is formed between an output node and a ground terminal in addition to a current path including first and second resistive elements provided between the output node and the ground terminal. Further, since a voltage value at a connecting point of the third resistive element and the fourth resistive element, and a voltage value at a connecting point of the first resistive element and the second resistive element become equal to each other by the second switch, a first reference voltage generated at the connecting point of the first resistive element and the second resistive element can be raised to a desired voltage value in a short time (i.e., the first reference voltage can be started). Then, afterwards, the control signal is brought into a second state to turn off the switches, whereby power consumption can be suppressed after the first reference voltage is started.

Further, the reference voltage generation circuit of the present invention can be suitably applied particularly to a DCDC converter low in power consumption. Even in this case, it is possible to shorten a start time at power-on and reduce power consumption. Further, first and second switches are turned on in a PWM mode (at heavy load) to thereby make it possible to enhance the response of a first reference voltage. In a PFM mode (at light load), the first and second switches are turned off to make it possible to suppress power consumption. Thus, it is possible to provide a DCDC converter high in efficiency and capable of stable operation.

DETAILED DESCRIPTION OF THE PREFERRED EMBODIMENTS

Embodiments of the present invention will hereinafter be described with reference to the accompanying drawings.

Figure 1:
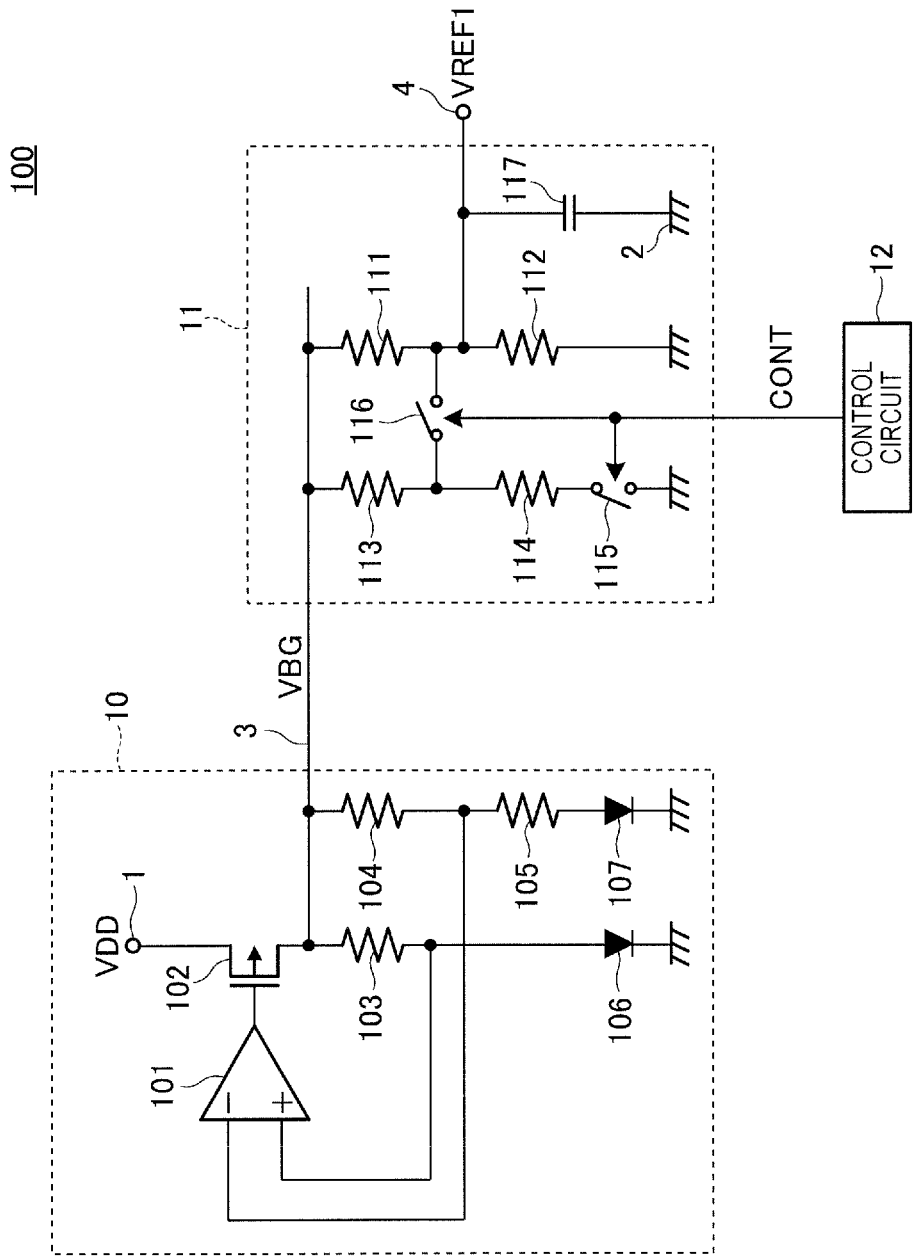
FIG. 1 is a circuit diagram of a reference voltage generation circuit according to an embodiment of the present invention.

FIG. 1 is a circuit diagram of a reference voltage generation circuit 100 according to the present embodiment.

The reference voltage generation circuit 100 according to the present embodiment is comprised of a bandgap reference circuit 10, an output circuit 11, and a control circuit 12 which generates a control signal CONT, and generates a reference voltage VREF1 at an output terminal 4.

The bandgap reference circuit 10 is equipped with an op amplifier 101, an output transistor 102 comprised of a PMOS transistor, resistive elements 103 to 105, and diodes 106 and 107.

The output transistor 102 has a source connected to a power supply terminal 1, a drain connected to an output node 3, and a gate connected to an output terminal of the op amplifier 101.

The resistive elements 104 and 105 and the diode 107 are connected in series between the output node 3 and a ground terminal 2. The resistive element 103 and the diode 106 are connected in series between the output node 3 and the ground terminal 2.

The op amplifier 101 has an inversion input terminal connected to a connecting point of the resistive elements 104 and 105, and a non-inversion input terminal connected to a connecting point of the resistive element 103 and the diode 106.

With such a configuration, a bandgap voltage VBG is generated at the output node 3.

The output circuit 11 is equipped with resistive elements 111 to 114, switches 115 and 116, and a capacitor 117.

The resistive elements 111 and 112 are connected in series between the output node 3 of the bandgap reference circuit 10 and the ground terminal 2. A connecting point of the resistive elements 111 and 112 is connected to the output terminal 4. The resistive elements 113 and 114 and the switch 115 are connected in series between the output node 3 and the ground terminal 2. A ratio between resistance values of the resistive elements 113 and 114 is set equal to a ratio between resistance values of the resistive elements 111 and 112.

The switch 116 has one end connected to the connecting point of the resistive elements 111 and 112, and the other end connected to a connecting point of the resistive elements 113 and 114.

The switches 115 and 116 are on/off-controlled by the control signal CONT generated from the control circuit 12.

The capacitor 117 is provided between the output terminal 4 and the ground terminal 2 for the purpose of measures against noise.

The operation of the reference voltage generation circuit 100 according to the present embodiment will next be described.

First, when a power supply voltage VDD is applied, the control circuit 12 brings the control signal CONT into a first state (e.g., a HIGH level). Thus, the switches 115 and 116 are turned on so that a current path including the resistive elements 113 and 114 and the switch 115 is formed between the output node 3 and the ground terminal 2. Further, the connecting point of the resistive elements 113 and 114 and the connecting point of the resistive elements 111 and 112 are connected to each other by the switch 116, so that the connecting point of the resistive elements 113 and 114 and the connecting point of the resistive elements 111 and 112 are made equal in voltage value to each other.

Thus, two of a current path including the resistive elements 111 and 112 and the current path including the resistive elements 113 and 114 and the switch 115 are formed as current paths between the output node 3 and the ground terminal 2. Further, the connecting point of the resistive elements 113 and 114 and the connecting point of the resistive elements 111 and 112 are made equal in voltage value to each other. It is therefore possible to raise (i.e., start a first reference voltage) the reference voltage VREF1 generated at the output terminal 4 to a desired voltage value in a short time.

Thereafter, the switches are turned off with the control signal CONT as a second state (LOW level, for example) to thereby make it possible to suppress power consumption after the reference voltage VREF1 is started.

Here, it is preferable that the resistance value of the resistive element 113 is set smaller than the resistance value of the resistive element 111, and the resistance value of the resistive element 114 is set smaller than the resistance value of the resistive element 112. With such a configuration, when the switches 115 and 116 are turned on, much current flows from the output node 3 to the ground terminal 2 by the current path including the resistive elements 113 and 114 and the switch 115. It is therefore possible to quickly set the voltage of the output terminal 4 being connected to the connecting point of the resistive elements 113 and 114, i.e., being connected to this connecting point by the switch 116 to a desired voltage value.

Incidentally, the configuration for switching the control signal CONT from the first state to the second state by the control circuit 12 can be realized in the following manner, for example.

The control circuit 12 is configured to measure in advance the time taken until the reference voltage VREF1 reaches the desired voltage value from the time of power-on, in the state in which the switches 115 and 116 are turned on, count the time by a timer from the time of power-on, and switch the control signal CONT from the first state to the second state, based on reaching of an elapsed time from the time of power-on to the pre-measured time.

Thus, according to the reference voltage generation circuit 100 according to the present embodiment, it is possible to shorten a start time and suppress power consumption.

Examples in each of which the reference voltage generation circuit 100 according to the present embodiment is applied to a DCDC converter will next be described using FIGS. 2 and 3.

Figure 2:
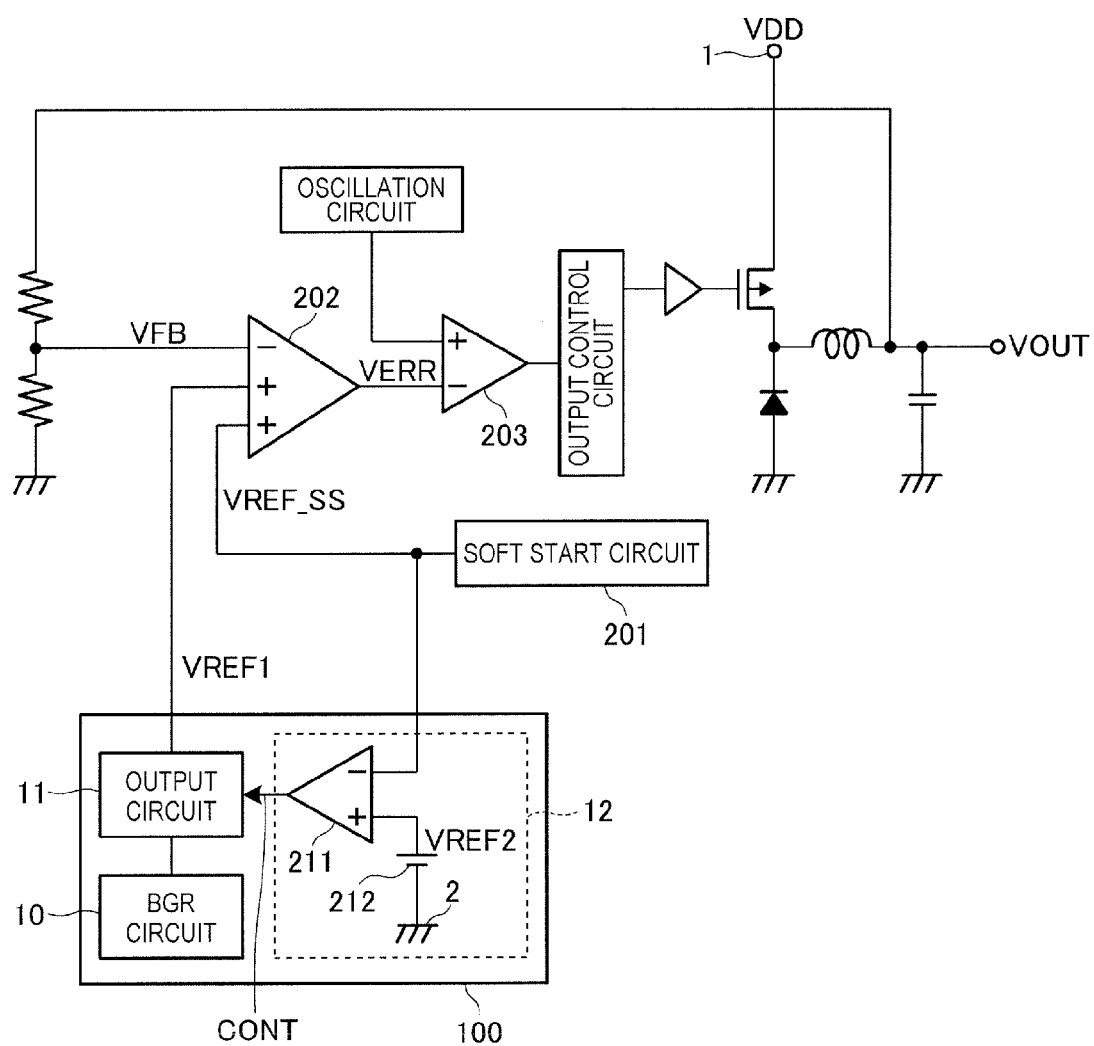
FIG. 2 is a circuit diagram illustrating one example of a DCDC converter equipped with the reference voltage generation circuit illustrated in FIG. 1.

FIG. 2 is a circuit diagram of a DCDC converter 200 which is one example of the DCDC converter equipped with the reference voltage generation circuit 100 illustrated in FIG. 1.

Since the basic configuration of the DCDC converter 200 is general, its detailed description will be omitted here. A description will be made about how the reference voltage generation circuit 100 is used in the DCDC converter 200.

The DCDC converter 200 of the present example is equipped with a soft start circuit 201 which outputs a soft start voltage VREF_SS for executing a soft start.

Two non-inversion input terminals of an error amplifier 202 are respectively input with a reference voltage VREF1 generated from the reference voltage generation circuit 100 and the soft start voltage VREF_SS. An inversion input terminal of the error amplifier 202 is input with a feedback voltage VFB obtained by dividing an output voltage VOUT of the DCDC converter 200.

The error amplifier 202 compares the lower one of the reference voltage VREF1 and the soft start voltage VREF_SS and the feedback voltage VFB and outputs an error voltage VERR to a comparator 203.

Although the soft start voltage VREF_SS gradually rises after power-on, the feedback voltage VFB and the soft start voltage VREF_SS are compared by the error amplifier 202 when the soft start voltage VREF_SS is lower than the reference voltage VREF1, and the reference voltage VREF1 does not affect the error voltage VERR being the output of the error amplifier 202.

Then, when a prescribed soft start time elapses, the soft start voltage VREF_SS becomes higher than the reference voltage VREF1. Thus, afterwards, the feedback voltage VFB and the reference voltage VREF1 are compared by the error amplifier 202, and the soft start voltage VREF_SS does not exert influence on the error voltage VERR being the output of the error amplifier 202.

On the other hand, in the reference voltage generation circuit 100 in the DCDC converter 200 of the present example, a control circuit 12 is configured to have a comparator 211 and a reference voltage source 212. The comparator 211 has an inversion input terminal input with the soft start voltage VREF_SS, and a non-inversion input terminal input with a reference voltage VREF2 of the reference voltage source 212. The reference voltage VREF2 is a prescribed voltage which becomes the reference of completion of the soft start.

After power-on, the reference voltage generation circuit 100 is operated in the following manner simultaneously with the execution of the soft start such as described above.

Since the soft start voltage VREF_SS serves as the voltage which gradually rises from a ground potential after power-on, the soft start voltage VREF_SS is lower than the reference voltage VREF2 immediately after power-on. Therefore, the comparator 211 outputs a signal of a HIGH level. That is, the comparator 211 brings a control signal CONT into a first state. Thus, the switches 115 and 116 illustrated in FIG. 1 are turned on so that a current path including the resistive elements 113 and 114 and the switch 115 is formed, and a connecting point of the resistive elements 113 and 114 and a connecting point (i.e., output terminal 4) of the resistive elements 111 and 112 are made equal in voltage value to each other. Accordingly, the reference voltage VREF1 input to the error amplifier 202 is started in a short time after power-on.

Thereafter, when the soft start voltage VREF_SS further rises and becomes higher than the reference voltage VREF2, the comparator 211 outputs a signal of a LOW level. That is, the comparator 211 brings the control signal CONT into a second state. Thus, the switches 115 and 116 illustrated in FIG. 1 are turned off so that there is no current path including the resistive elements 113 and 114, and only the current path including the resistive elements 111 and 112 large in resistance value is formed as the current path between the output node 3 and the ground terminal 2. Accordingly, after power-on, power consumption of the reference voltage generation circuit 100 can be suppressed after the reference voltage VREF1 is started.

Here, since it is necessary that the reference voltage VREF2 of the reference voltage source 212 which configures the control circuit 12 is a voltage which becomes the reference of completion of the soft start, and the reference voltage VREF1 completely reaches a desired voltage value when the soft start is completed and an object to be compared with the feedback voltage VFB in the error amplifier 202 is switched from the soft start voltage VREF_SS to the reference voltage VREF1, the reference voltage VREF2 is preferably set to a voltage value slightly higher than the reference voltage VREF1.

Thus, according to the DCDC converter 200 of the present example, the control signal CONT which controls the switches 115 and 116 in the reference voltage generation circuit 100 by using the signal used in the soft start executed from the time of power-on can be switched from the first state at the time of power-on to the second state, based on the completion of the soft start.

Figure 3:
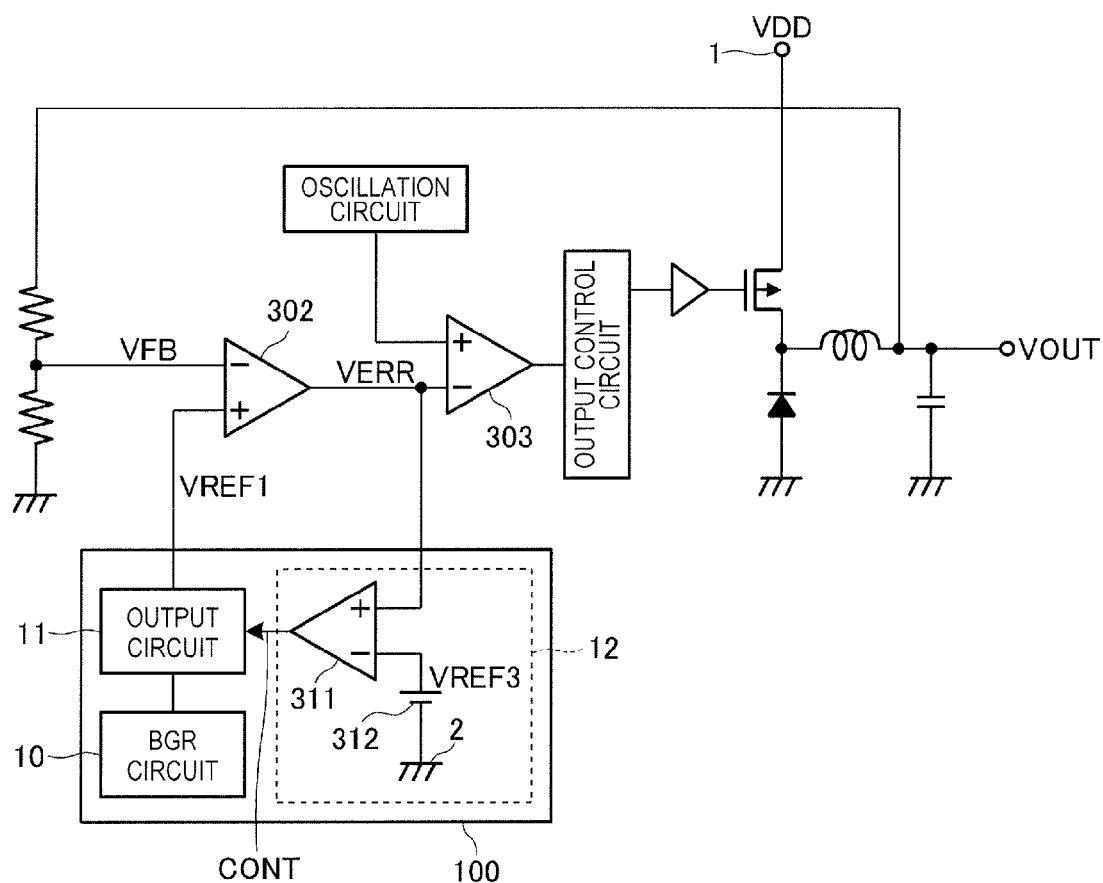
FIG. 3 is a circuit diagram illustrating another example of the DCDC converter equipped with the reference voltage generation circuit illustrated in FIG. 1.
Figure 4:
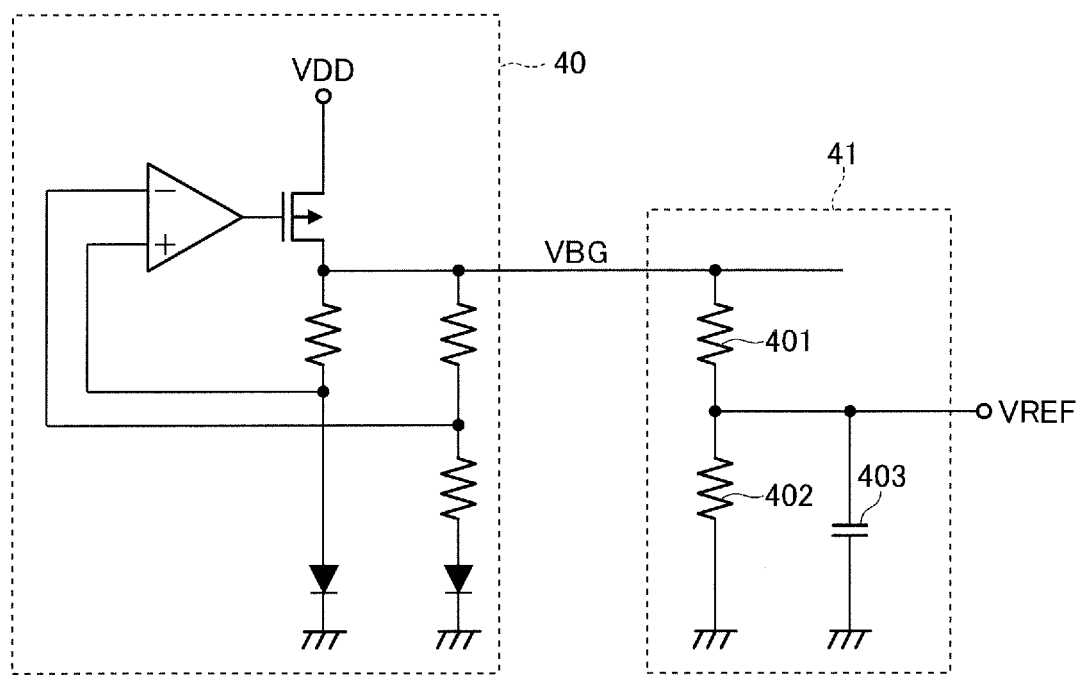
FIG. 4 is a circuit diagram of a reference voltage generation circuit according to a related art embodiment.

FIG. 3 is a circuit diagram of a DCDC converter 300 which is another example of the DCDC converter equipped with the reference voltage generation circuit 100 of FIG. 1.

Since the basic configuration of the DCDC converter 300 is general in a manner similar to the above DCDC converter 200, its detailed description will be omitted.

The DCDC converter 300 of the present example is configured to switch switches 115 and 116 in a reference voltage generation circuit 100 in synchronism with the switching between a PWM mode and a PFM mode.

Specifically, a control circuit 12 of the reference voltage generation circuit 100 is equipped with a comparator 311 and a reference voltage source 312. The comparator 311 has an inversion input terminal input with a reference voltage VREF3 of the reference voltage source 312, and a non-inversion input terminal input with an error voltage VERR being an output of an error amplifier 302.

The error amplifier 302 has a non-inversion input terminal input with a reference voltage VREF1 generated by the reference voltage generation circuit 100, and an inversion input terminal input with a feedback voltage VFB obtained by dividing an output voltage VOUT of the DCDC converter 300. The error amplifier 302 compares the reference voltage VREF1 and the feedback voltage VFB and outputs the error voltage VERR to a comparator 303.

The error voltage VERR becomes a high potential as the load connected to the DCDC converter 300 gets heavy, and becomes a low potential as the load gets light. Therefore, the reference voltage VREF3 is made into a prescribed voltage to be a reference for switching between the PWM mode and the PFM mode to thereby switch a control signal CONT to a first state and a second state, based on the voltage value of the error voltage VERR.

With such a configuration, the comparator 311 outputs a signal of a HIGH level in the PWM mode in which the error voltage VERR is higher than the reference voltage VREF3. That is, the comparator 311 brings the control signal CONT into the first state. Thus, the switches 115 and 116 illustrated in FIG. 1 are turned on so that a current path including the resistive elements 113 and 114 and the switch 115 is formed, and a connecting point of the resistive elements 113 and 114 and a connecting point of the resistive elements 111 and 112 are made equal in voltage value to each other.

On the other hand, the comparator 311 outputs a signal of a LOW level in the PFM mode in which the error voltage VERB is lower than the reference voltage VREF3. That is, the comparator 311 brings the control signal CONT into the second state. Thus, the switches 115 and 116 illustrated in FIG. 1 are turned off so that there is no current path including the resistive elements 113 and 114, and only a current path including the resistive elements 111 and 112 large in resistance value is formed as the current path between the output node 3 and the ground terminal 2.

In the PWM mode in which the load is a heavy load, switching is continuously performed, and charging and discharging are increased through a gate capacitance of a differential input transistor which configures the error amplifier 302. Therefore, the reference voltage VREF1 being the output of the reference voltage generation circuit 100 also becomes easy to vary. According to the present example, however, since the current path including the resistive elements 113 and 114 and the switch 115 is formed in the PWM mode, and the connecting point of the resistive elements 113 and 114 and the connecting point (output terminal 4) of the resistive elements 111 and 112 are connected to each other, the reference voltage VREF1 can be immediately returned to a desired voltage value even though it varies.

Further, it is possible to eliminate the current path including the resistive elements 113 and 114 and reduce power consumption of the reference voltage generation circuit 100 in the PFM mode in which the load is a light load.

Thus, according to the DCDC converter 300 of the present example, the response of the reference voltage VREF1 can be enhanced in the PWM mode (at the heavy load). In the PFM mode (at the light load), the efficiency of the DCDC converter 300 can be improved by operating the reference voltage generation circuit 100 with low current consumption.

Although the embodiments of the present invention have been described above, the present invention is not limited to the above embodiments. It is needless to say that various changes can be made thereto within the scope not departing from the gist of the present invention.

For example, in addition to the output signal CONT of the comparator 311 in the DCDC converter 300 illustrated in FIG. 3 being input to the output circuit 11 in the reference voltage generation circuit 100 of the DCDC converter 200 illustrated in FIG. 2 to switch on/off of the switches 115 and 116 illustrated in FIG. 1 at power-on and after start-up, the DCDC converter 300 can also be configured to switch on/off of the switches 115 and 116 even in the PWM mode and PFM mode at its normal operation.

Further, although the control signal CONT is generated by the control circuit 12 in the DCDC converter 300 illustrated in FIG. 3, a signal for switching the PWM mode and the PFM mode may be directly input to the output circuit 11 as the control signal CONT where the signal is generated separately, so as to control on/off of the switches 115 and 116.

What is claimed is:

1. A reference voltage generation circuit comprising:
a bandgap reference circuit which generates a bandgap voltage at an output node;
a first resistive element and a second resistive element connected in series between the output node and a ground terminal;
a third resistive element, a fourth resistive element, and a first switch connected in series between the output node and the ground terminal;
a second switch having one end connected to a connecting point of the first resistive element and the second resistive element, and the other end connected to a connecting point of the third resistive element and the fourth resistive element; and
a control circuit which generates a control signal controlling on/off of the first and second switches,
wherein a ratio between resistance values of the first resistive element and the second resistive element is equal to a ratio between resistance values of the third resistive element and the fourth resistive element,
wherein the first and second switches are turned on when the control signal is a first state and turned off when the control signal is a second state, and
wherein a first reference voltage is generated at the connecting point of the first resistive element and the second resistive element.

2. The reference voltage generation circuit according to claim 1, wherein the third resistive element is smaller in resistance value than the first resistive element.

3. The reference voltage generation circuit according to claim 1, wherein the control circuit brings the control signal into a first state at power-on and brings the control signal into a second state, based on reaching of an elapsed time from the time of the power-on to a time when the first reference voltage becomes a prescribed voltage.

4. A DCDC converter comprising:
a reference voltage generation circuit according to claim 1; and
an error amplifier having an inversion input terminal input with a feedback voltage obtained by dividing an output voltage, and a non-inversion input terminal input with the first reference voltage.

5. A DCDC converter comprising:
a reference voltage generation circuit according to claim 1,
wherein the control circuit brings the control signal into a first state at power-on and brings the control signal into a second state, based on the completion of a soft start executed from the time of the power-on.

6. The DCDC converter according to claim 5, comprising:
a soft start circuit which outputs a soft start voltage for executing the soft start,
wherein the control circuit has a comparator which compares a second reference voltage to be a reference of the completion of the soft start and the soft start voltage and outputs the control signal as an output signal, and
wherein the comparator brings the control signal into a first state when the soft start voltage is lower than the second reference voltage, and brings the control signal into a second state when the soft start voltage is higher than the second reference voltage.

7. A DCDC converter comprising:
a reference voltage generation circuit according to claim 1,
wherein the control circuit brings the control signal into a first state at the time of a PWM operation, and brings the control signal into a second state at the time of a PFM operation.

8. The DCDC converter according to claim 7, comprising:
an error amplifier having an inversion input terminal input with a feedback voltage obtained by dividing an output voltage, and a non-inversion input terminal input with the first reference voltage,
wherein the control circuit has a comparator which compares a third reference voltage to be a reference of switching from the PWM operation to the PFM operation and an output voltage of the error amplifier and outputs the control signal as an output signal, and
wherein the comparator brings the control signal into a first state when the output voltage of the error amplifier is higher than the third reference voltage, and brings the control signal into a second state when the output voltage of the error amplifier is lower than the third reference voltage.

* * * * *